United States Patent
Hirashita et al.

(10) Patent No.: US 9,620,817 B2
(45) Date of Patent: Apr. 11, 2017

(54) LIQUID ELECTROLYTE FOR LITHIUM BATTERIES, METHOD FOR PRODUCING THE SAME, AND LITHIUM BATTERY COMPRISING THE LIQUID ELECTROLYTE FOR LITHIUM BATTERIES

(71) Applicants: NAGOYA INSTITUTE OF TECHNOLOGY, Nagoya-shi, Aichi (JP); TOYOTA JIDOSHA KABUSHIKI KAISHA, Toyota-shi, Aichi (JP)

(72) Inventors: Tsunehisa Hirashita, Nagoya (JP); Shuki Araki, Nagoya (JP); Hirofumi Nakamoto, Kyoto (JP); Atsushi Shirasawa, Sunto-gun (JP)

(73) Assignees: NAGOYA INSTITUTE OF TECHNOLOGY, Nagoya-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/427,872

(22) PCT Filed: Sep. 9, 2013

(86) PCT No.: PCT/JP2013/074248
§ 371 (c)(1),
(2) Date: Mar. 12, 2015

(87) PCT Pub. No.: WO2014/042124
PCT Pub. Date: Mar. 20, 2014

(65) Prior Publication Data
US 2015/0236377 A1  Aug. 20, 2015

(30) Foreign Application Priority Data
Sep. 14, 2012  (JP) .................. 2012-203231

(51) Int. Cl.
H01M 10/0567 (2010.01)
H01M 10/0525 (2010.01)
H01M 12/08 (2006.01)

(52) U.S. Cl.
CPC ... *H01M 10/0567* (2013.01); *H01M 10/0525* (2013.01); *H01M 12/08* (2013.01); *H01M 2220/30* (2013.01); *H01M 2300/0025* (2013.01)

(58) Field of Classification Search
CPC .................. H01M 10/056; H01M 10/0564
See application file for complete search history.

(56) References Cited

U.S. PATENT DOCUMENTS

| | | | | |
|---|---|---|---|---|
| 5,401,621 A | * | 3/1995 | Kojima | G03C 7/42 430/372 |
| 2006/0027461 A1 | * | 2/2006 | Heber | C25D 3/60 205/252 |

(Continued)

FOREIGN PATENT DOCUMENTS

| JP | 2003-123838 A | 4/2003 |
|---|---|---|
| JP | 2007-035413 A | 2/2007 |

(Continued)

*Primary Examiner* — Barbara Gilliam
*Assistant Examiner* — Stephan Essex
(74) *Attorney, Agent, or Firm* — Oliff PLC

(57) ABSTRACT

The present invention is to provide: a liquid electrolyte for batteries, which has excellent stability to lithium metals; a method for producing the liquid electrolyte; and a lithium battery comprising the liquid electrolyte. Presented is a liquid electrolyte for lithium batteries, wherein the liquid electrolyte comprises a mesoionic compound represented by the following general formula (1):

(Continued)

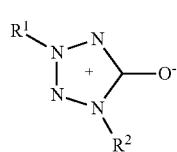

General Formula (1)

wherein $R^1$ is an aliphatic hydrocarbon group having 1 to 3 carbon atoms, and $R^2$ is a group represented by any one of the following general formulae (2), (3) and (4): General Formula (2): $-C_lH_{2l}-(OCH_2)_m-C_nH_{2n+1}$; General Formula (3): $-C_xH_{2x}-(CH_2OCH_2)_y-C_zH_{2z+1}$; and General Formula (4): $-C_pH_{2p}-(C_2H_4OCH_2)_q-C_rH_{2r+1}$.

8 Claims, 2 Drawing Sheets

(56) References Cited

U.S. PATENT DOCUMENTS

| | | |
|---|---|---|
| 2007/0026318 A1 | 2/2007 | Kishi et al. |
| 2013/0209915 A1 | 8/2013 | Hirashita et al. |
| 2014/0220476 A1 | 8/2014 | Hirashita et al. |

FOREIGN PATENT DOCUMENTS

| | | |
|---|---|---|
| JP | 2012/094278 A | 5/2012 |
| WO | 2008/056776 A1 | 5/2008 |
| WO | 2012/056292 A1 | 5/2012 |
| WO | 2013/031776 A1 | 3/2013 |

\* cited by examiner

LIQUID ELECTROLYTE FOR LITHIUM BATTERIES, METHOD FOR PRODUCING THE SAME, AND LITHIUM BATTERY COMPRISING THE LIQUID ELECTROLYTE FOR LITHIUM BATTERIES

TECHNICAL FIELD

The present invention relates to: a liquid electrolyte for lithium batteries, which has excellent stability to lithium metals; a method for producing the liquid electrolyte; and a lithium battery comprising the liquid electrolyte for lithium batteries.

BACKGROUND ART

A secondary battery is a battery that is able to convert chemical energy into electrical energy and discharge the energy. Moreover, it is also a battery that is able to convert electrical energy into chemical energy and store (charge) the chemical energy, by passing electrical current in a direction that is opposite to the direction of current at the time of discharge. Of secondary batteries, a lithium secondary battery has high energy density, so that it is widely used as a power source for portable devices such as a laptop personal computer, a cellular phones etc.

In a lithium secondary battery, when graphite (C) is used as an anode active material, a reaction represented by the following formula (I) proceeds at the anode, upon discharge:

$$Li_xC \rightarrow C + xLi^+ + xe^- \quad (I)$$

wherein $0 < x < 1$.

Electrons generated by the reaction of the formula (I) pass through an external circuit, work by an external load, and then reach the cathode. Lithium ions (Li$^+$) generated by the reaction of the formula (I) are transferred by electro-osmosis from the anode side to the cathode side through an electrolyte sandwiched between the anode and the cathode.

When lithium cobaltate ($Li_{1-x}CoO_2$) is used as a cathode active material, a reaction represented by the following formula (II) proceeds at the cathode, upon discharge:

$$Li_{1-x}CoO_2 + xLi^+ + xe^- \rightarrow LiCoO_2 \quad (II)$$

wherein $0 < x < 1$.

Upon charging the battery, reactions which are reverse to the reactions represented by the above formulae (I) and (II) proceed at the anode and the cathode. At the anode, graphite in which lithium has been intercalated by graphite intercalation ($Li_xC$) becomes reusable, while lithium cobaltate ($Li_{1-x}CoO_2$) is regenerated at the cathode. Because of this, discharge becomes possible again.

Conventional lithium secondary batteries are limited in the improvement of reliability, since they use combustible and volatile organic solvents.

Meanwhile, a lithium secondary battery that uses an ionic liquid (room-temperature molten-salt) as liquid electrolyte has been known as an effort to improve reliability. "Ionic liquid" as used herein is a salt which is liquid at 100° C. or less, and it is generally non-combustible and non-volatile. Such a non-combustible liquid electrolyte is advantageous in that it can not only improve reliability but also shows a relatively wide potential window (potential range) and provides a relatively high ion conductivity.

As a lithium secondary battery technique comprising an ionic liquid, a non-aqueous electrolyte secondary battery technique is disclosed in Patent Literature 1, which comprises a cathode, an anode and a non-aqueous electrolyte containing an ionic liquid and allyl phosphate.

CITATION LIST

Patent Literature 1: Japanese Patent Application Laid-Open No. 2007-035413

SUMMARY OF INVENTION

Technical Problem

An electrolyte is disclosed in paragraph [0090] of the Description of Patent Literature 1, which is obtained by dissolving lithium bis(trifluoromethanesulfonyl)amide, which is a kind of lithium salt, in N-methyl-N-propylpiperidinium bis(trifluoromethanesulfonyl)amide, which is a kind of ionic liquid. However, as a result of research, the inventors of the present invention have found that the electrolyte comprising such a conventional ionic liquid is unstable to lithium metals.

The present invention was achieved in light of the above circumstance. An object of the present invention is to provide a liquid electrolyte for lithium batteries, which has excellent stability to lithium metals; a method for producing the liquid electrolyte; and a lithium battery comprising the liquid electrolyte for lithium batteries.

Solution to Problem

The liquid electrolyte for lithium batteries of the present invention comprises a mesoionic compound represented by the following general formula (1):

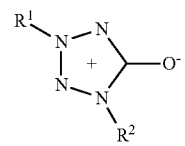

General Formula (1)

wherein R$^1$ is an aliphatic hydrocarbon group having 1 to 3 carbon atoms, and R$^2$ is a group represented by any one of the following general formulae (2), (3) and (4):

$$-C_lH_{2l}-(OCH_2)_m-C_n-H_{2n+1} \quad \text{General Formula (2)}$$

wherein l and n are each a real number of 0 or more; m is a real number of 1 or more; and the sum of l, m and n is 8 or less;

$$-C_xH_{2x}-(CH_2OCH_2)_y-C_zH_{2z+1} \quad \text{General Formula (3)}$$

wherein x and z are each a real number of 0 or more; y is a real number of 1 or more; and the sum of x, 2y and z is 8 or less; and $$-C_pH_{2p}-(C_2H_4OCH_2)_q-C_rH_{2r+1} \quad \text{General Formula (4)}$$

wherein p and r are each a real number of 0 or more; g is a real number of 1 or more; and the sum of p, 3q and r is 8 or less.

In the present invention, preferably, R$^2$ in the general formula (1) is one selected from the group consisting of methoxymethyl group (—CH$_2$OCH$_3$), 2-methoxyethyl group (—C$_2$H$_4$OCH$_3$), 3-methoxypropyl group (—C$_3$H$_6$OCH$_3$), 4-methoxybutyl group (—C$_4$H$_8$OCH$_3$), methoxymethoxymethyl group (—CH$_2$OCH$_2$OCH$_3$), (2-methoxyethoxy)methyl group (—CH$_2$OC$_2$H$_4$OCH$_3$), 2-(methoxymethoxy)ethyl group (—C$_2$H$_4$OCH$_2$OCH$_3$), 2-(2-methoxyethoxy)ethyl group (—C$_2$H$_4$OC$_2$H$_4$OCH$_3$) and 2-(methoxymethoxymethoxy)ethyl group (—C$_2$H$_4$OCH$_2$OCH$_2$OCH$_3$).

In the present invention, preferably, the liquid electrolyte further comprises a lithium salt at a concentration of 0.32 to 1.4 mol/kg.

The liquid electrolyte for lithium batteries of the present invention can be a liquid electrolyte for lithium-air batteries.

The lithium battery of the present invention is a lithium battery comprising at least a cathode, an anode and an electrolyte present between the anode and cathode, wherein at least one of the cathode, the anode and the electrolyte comprises the liquid electrolyte for lithium batteries.

The method for producing a liquid electrolyte for lithium batteries according to the present invention, comprises the steps of: preparing a lithium salt and a mesoionic compound represented by the general formula (1), and producing a liquid electrolyte for lithium batteries which has a water concentration of 200 ppm or less, by mixing at least the lithium salt and the mesoionic compound.

In the production method of the present invention, preferably, $R^2$ in the general formula (1) is one selected from the group consisting of methoxymethyl group ($-CH_2OCH_3$), 2-methoxyethyl group ($-C_2H_4OCH_3$), 3-methoxypropyl group ($-C_3H_6OCH_3$), 4-methoxybutyl group ($-C_4H_8OCH_3$), methoxymethoxymethyl group ($-CH_2OCH_2OCH_3$), (2-methoxyethoxy)methyl group ($-CH_2OC_2H_4OCH_3$), 2-(methoxymethoxy)ethyl group ($-C_2H_4OCH_2OCH_3$) 2-(2-methoxyethoxy)ethyl group ($-C_2H_4OC_2H_4OCH_3$) and 2-(methoxymethoxymethoxy)ethyl group ($-C_2H_4OCH_2OCH_2OCH_3$).

In the production method of the present invention, in the producing step, the lithium salt is preferably adjusted to have a lithium salt concentration of 0.32 to 1.4 mol/kg in the liquid electrolyte.

The production method of the present invention can be a method for producing a liquid electrolyte for lithium-air batteries.

In the production method of the present invention, the mesoionic compound can be synthesized under a basic condition.

Advantageous Effects of Invention

According to the present invention, by containing a mesoionic compound which has an ether group in a side chain of the cation part, when comparing an oxygen atom ($-O^-$) in the anion part of the mesoionic compound to an ether oxygen atom in the side chain thereof, the ether oxygen atom in the side chain is closer to lithium metals than the oxygen atom in the anion part; therefore, when the liquid electrolyte for lithium batteries is used in a lithium battery, contact between the anion part and lithium metals can be prevented and, as a result, the stability of the liquid electrolyte to lithium metals can be increased higher than conventional liquid electrolytes.

DESCRIPTION OF EMBODIMENTS

1. Liquid Electrolyte for Lithium Batteries

Figure 1:
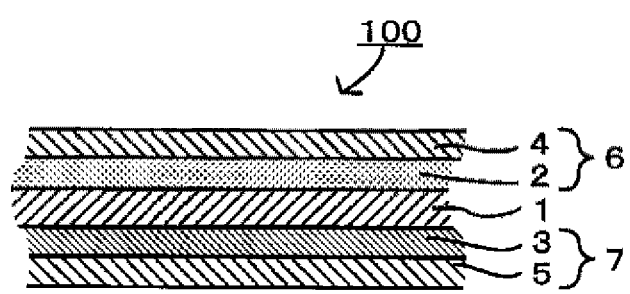
FIG. 1 is a view showing an example of the layer structure of the lithium battery according to the present invention, and it is also a view schematically showing a cross section of the lithium battery along the laminating direction.

The liquid electrolyte for lithium batteries of the present invention comprises a mesoionic compound represented by the following general formula (1):

General Formula (1)

wherein $R^1$ is an aliphatic hydrocarbon group having 1 to 3 carbon atoms, and $R^2$ is a group represented by any one of the following general formulae (2), (3) and (4):

General Formula (2)

wherein l and n are each a real number of 0 or more; m is a real number of 1 or more; and the sum of l, m and n is 8 or less;

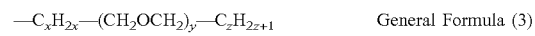

General Formula (3)

wherein x and z are each a real number of 0 or more; y is a real number of 1 or more; and the sum of x, 2y and z is 8 or less; and

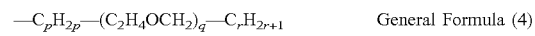

General Formula (4)

wherein p and r are each a real number of 0 or more; q is a real number of 1 or more; and the sum of p, 3q and r is 8 or less.

A mesoionic compound is a five-membered (or six-membered) heterocyclic compound which is not fully represented by a single covalent bond structure or an ionic structure, and which has a 6π electron in the ring thereof. The mesoionic compound used in the present invention, which has a tetrazolium mesoionic structure, has a five-membered ring composed of four nitrogen atoms and one carbon atom, and is considered to obtain aromaticity and be stabilized by pushing out negative charge into an exocyclic oxygen. The tetrazolium mesoionic compound used in the present invention is turned into an intramolecular salt (that is, an ionic substance) by polarization and is turned into a liquid by selection of alkyl groups. Also, when it is an intramolecular salt, it has a lower boiling point than intermolecular salts and is easy to distill.

As described above, electrolytes comprising conventional ionic liquids are very unstable to lithium metals. As a result of research, the inventors of the present invention have found that the reason for the unstability of conventional electrolytes to lithium metals is due to the chemical structure of conventional ionic liquids.

As a result of diligent research, the inventors of the present invention have found that a liquid electrolyte comprising the mesoionic compound represented by the above general formula (1) has very excellent stability to lithium metals. Based on this finding, the inventors finally completed the present invention.

Conventional mesoionic compounds, such as 1-ethyl-3-methyltetrazolium-5-olate (hereinafter may be referred to as EMTO) shown in the below-described Comparative Example 1, have an ethyl group at the 1-position of the cation part. In a mesoionic compound having a rigid and short hydrocarbon group such as an ethyl group, a negatively-charged anion part (—O⁻ part) is easily brought into contact with the surface of lithium metals; therefore, the mesoionic compound easily reacts with lithium metals.

Meanwhile, a main characteristic of the mesoionic compound used in the present is that the compound has an ether group in the side chain at the 1-position of the cation part. From the viewpoint of chemical structure, the side chain having the ether group is more flexible than the side chain composed of hydrocarbon groups only. Therefore, the ether oxygen atom in the side chain is closer to the surface of lithium metals than the oxygen atom in the anion part (—O⁻ part). As a result, the anion part of the mesoionic compound is less likely to be brought into contact with and react with lithium metals, so that the decomposition of the mesoionic compound due to the reaction, is less likely to occur.

In the general formula (1), $R^2$ is not particularly limited, as long as it has such a structure that, as shown by the general formula (2), (3) or (4), an aliphatic hydrocarbon group is serially linked by an ether group. However, the total number of carbon atoms of the aliphatic hydrocarbon group is 1 to 8. When the total number of the carbon atoms is 9 or more, the substituent group is too long, so that there may be an increase in viscosity and a decrease in ion conductivity. In the general formula (2), the total number of the carbon atoms is equal to the sum of 1, m and n. In the general formula (3), the total number of the carbon atoms is equal to the sum of x, 2y and z. In the general formula (4), the total number of the carbon atoms is equal to the sum of p, 3q and r. Also in $R^2$, the number of oxygen atoms is 1 or more. However, the upper limit of the number of oxygen atoms follows the chemical structure of the general formula (2), (3) or (4), and it is naturally determined when the total number of the carbon atoms in $R^2$ is determined.

The total number of the carbon atoms in $R^2$ is preferably 2 or more, more preferably 3 or more. The total number of the carbon atoms in $R^2$ is preferably 7 or less, more preferably 6 or less.

By containing the straight-chain substituent group $R^2$ as shown by the general formula (2), (3) or (4), the effect of keeping the anion part of the mesoionic compound away from the surface of lithium metals is further enhanced.

Preferably, $R^2$ in the general formula (1) is one selected from the group consisting of methoxymethyl group (—CH₂OCH₃), 2-methoxyethyl group (—C₂H₄OCH₃), 3-methoxypropyl group (—C₃H₆OCH₃), 4-methoxybutyl group (—C₄H₈OCH₃), methoxymethoxymethyl group (—CH₂OCH₂OCH₃), (2-methoxyethoxy)methyl group (—CH₂OC₂H₄OCH₃), 2-(methoxymethoxy)ethyl group (—C₂H₄OCH₂OCH₃) 2-(2-methoxyethoxy)ethyl group (—C₂H₄OC₂H₄OCH₃) and 2-(methoxymethoxymethoxy) ethyl group (—C₂H₄OCH₂OCH₂OCH₃). Of them, 2-methoxyethyl group (—C₂H₄OCH₃) is more preferred as $R^2$.

Preferably, the liquid electrolyte for lithium batteries of the present invention further comprises a lithium salt, as a supporting salt, in addition to the mesoionic compound. Examples of lithium salts include inorganic lithium salts such as LiOH, LiPF₆, LiBF₄, LiClO₄ and LiAsF₆, and organic lithium salts such as LiCF₃SO₃, LiN(SO₂CF₃)₂(Li-TFSA), LiN(SO₂C₂F₅)₂ and LiC(SO₂CF₃)₃. Such lithium salts can be used alone or in combination of two or more kinds.

The concentration of the lithium salt in the liquid electrolyte for lithium batteries is preferably 0.10 to 2.4 mol/kg. When the lithium salt concentration is less than 0.10 mol/kg, the lithium salt concentration is too low and the lithium ion amount is too small; therefore, there may be poor lithium ion transport. On the other hand, when the lithium salt concentration is more than 2.4 mol/kg, the lithium salt concentration is too high and thus the viscosity of the liquid electrolyte is too high; therefore, there may be poor lithium ion transport.

The concentration of the lithium salt in the liquid electrolyte for lithium batteries is more preferably 0.32 mol/kg or more, still more preferably 0.5 mol/kg or more. Also, the lithium salt concentration is more preferably 1.4 mol/kg or less.

The liquid electrolyte for lithium batteries of the present invention can further comprise a non-aqueous electrolyte, in addition to the mesoionic compound and the lithium salt.

As the non-aqueous electrolyte, a non-aqueous liquid electrolyte or non-aqueous gel electrolyte can be used.

A non-aqueous liquid electrolyte generally comprises the above-described lithium salt and a non-aqueous solvent. Examples of the non-aqueous solvent include ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, acetonitrile, 1,2-dimethoxyethane, 1,3-dimethoxypropane, diethyl ether, tetrahydrofuran, 2-methyltetrahydrofuran and mixtures thereof. From the point of view that dissolved oxygen can be efficiently used for reaction, the non-aqueous solvent is preferably a solvent with high oxygen solubility. In the non-aqueous liquid electrolyte, the lithium salt concentration is in the range of 0.5 to 3 mol/L, for example.

The non-aqueous gel electrolyte used in the present invention is generally a non-aqueous liquid electrolyte gelled by addition of a polymer. For example, it can be obtained by gelling the above-described non-aqueous liquid electrolyte by adding a polymer such as polyethylene oxide (PEO), polyacrylonitrile (PAN) or polymethyl methacrylate (PMMA) thereto. In the present invention, for example, there may be used LiTFSA (LiN(CF₃SO₂)₂)-PEO-based non-aqueous gel electrolytes.

The applications of the liquid electrolyte for lithium batteries of the present invention are not particularly limited, as long as they are applications as materials for lithium batteries. For example, the liquid electrolyte for lithium batteries of the present invention can be used as an electrolyte which functions to exchange ions between electrodes and as an electrolyte for electrodes which can increase ion conductivity of electrodes.

The type of batteries in which the liquid electrolyte for lithium batteries of the present invention is used, is not particularly limited. For example, the liquid electrolyte for lithium batteries of the present invention can be used in a lithium-air battery, and it can be also used in a lithium secondary battery.

2. Lithium Battery

The lithium battery of the present invention is a lithium battery comprising at least a cathode, an anode- and an electrolyte present between the anode and cathode, wherein at least one of the cathode, the anode and the electrolyte comprises the liquid electrolyte for lithium batteries.

FIG. 1 is a view showing an example of the layer structure of the lithium battery according to the present invention, and it is also a view schematically showing a cross section of the battery cut along the laminating direction. However, the lithium battery of the present invention is not limited to this example.

A lithium battery 100 comprises a cathode 6, an anode 7 and an electrolyte 1, the cathode 6 comprising a cathode active material layer 2 and a cathode current collector 4, the anode 7 comprising an anode active material layer 3 and an anode current collector 5, and the electrolyte 1 being sandwiched between the cathode 6 and the anode 7.

In the present invention, at least one of the cathode, the anode and the electrolyte comprises the liquid electrolyte for lithium batteries of the present invention. Hereinafter, the cathode, anode and electrolyte, which constitute the lithium battery of the present invention, and a separator and a battery case, which are suitably used in the lithium battery of the present invention, will be described in detail.

The cathode used in the present invention preferably comprises a cathode active material layer which comprises a cathode active material. In addition, the cathode generally comprises a cathode current collector and a cathode lead that is connected to the cathode current collector. When the lithium battery of the present invention is a lithium-air battery, the battery comprises an air electrode, in place of the cathode, which comprises an air electrode layer.

Hereinafter, a case where a cathode comprising a cathode active material layer is used as the cathode, will be explained.

Concrete examples of cathode active materials that can be used in the present invention, include $LiCoO_2$, $LiNi_{1/3}Mn_{1/3}Co_{1/3}O_2$, $LiNiPO_4$, $LiMnPO_4$, $LiNiO_2$, $LiMn_2O_4$, $LiCoMnO_4$, $Li_2NiMn_3O_8$, $Li_3Fe_2(PO_4)_3$ and $Li_3V_2(PO_4)_3$. Among them, in the present invention, it is preferable to use $LiCoO_2$ as the cathode active material.

The thickness of the cathode active material layer used in the present invention varies depending on the intended use of the lithium battery, etc. However, the thickness is preferably to 250 μm, more preferably 20 to 200 μm, still more preferably 30 to 150 μm.

The cathode active material preferably has an average particle diameter of 1 to 50 μm, more preferably 1 to 20 μm, still more preferably 3 to 5 μm. When the average particle diameter of the cathode active material is too small, there is a possibility of poor handling properties. When the average particle diameter of the cathode active material is too large, there may be a difficulty in obtaining a flat cathode active material layer. The average particle diameter of the cathode active material can be obtained by, for example, measuring the particle diameters of active material carrier particles observed with a scanning electron microscope (SEM) and averaging the particle diameters.

As needed, the cathode active material layer can contain an electroconductive material, a binder, etc.

The electroconductive material used in the present invention is not particularly limited, as long as it can increase the electrical conductivity of the cathode active material layer. The examples include carbon blacks such as acetylene black and Ketjen Black. The content of the electroconductive material in the cathode active material layer varies depending on the type of the electroconductive material; however, it is generally 1 to 10% by mass.

As the binder used in the present invention, for example, there may be mentioned polyvinylidene fluoride (PVDF) and polytetrafluoroethylene (PTFE). The content of the binder in the cathode active material layer is required to be a content which allows the cathode active material and so on to be fixed, and is preferably as small as possible. The content of the binder is generally 1 to 10% by mass.

The cathode current collector used in the present invention functions to collect current from the cathode active material layer. Examples of materials for the cathode current collector include aluminum, stainless-steel (SUS), nickel, iron and titanium, and preferred are aluminum and stainless-steel (SUS). Examples of the form of the cathode current collector include a foil form, a plate form and a mesh form. Preferred is a foil form.

The cathode active material layer can further contain an electrolyte for the cathode. In this case, as the electrolyte for the cathode, there may be used not only the liquid electrolyte for lithium batteries of the present invention but also the below-described liquid electrolyte, gel electrolyte, solid electrolyte, etc.

The method for producing the cathode used in the present invention is not particularly limited, as long as it is a method that can provide the above-described cathode. After forming the cathode active material layer, the cathode active material layer can be pressed to increase electrode density.

Hereinafter, a case where an air electrode comprising an air electrode layer is used as the cathode, will be explained. The air electrode layer used in the present invention comprises at least an electroconductive material. As needed, the air electrode layer can further contain at least one of a catalyst and a binder.

The electroconductive material used in the present invention is not particularly limited, as long as it is electrically conductive. As the material, for example, there may be mentioned a carbonaceous material. The carbonaceous material can be porous or non-porous. It is preferably porous in the present invention, so that it has a large specific surface area and offers many reaction sites. As the porous carbonaceous material, in particular, there may be mentioned mesoporous carbon, etc. As the non-porous carbonaceous material, in particular, there may be mentioned graphite, acetylene black, carbon nanotubes, carbon fibers, etc. The content of the electroconductive material in the air electrode layer is preferably 65 to 99% by mass, more preferably 75 to 95% by mass. This is because when the content of the electroconductive material is too small, the area of reaction sites is decreased, resulting in a possible decrease in battery capacity. On the contrary, when the content of the electroconductive material is too large, the content of the catalyst becomes relatively small, resulting in a possibility of poor catalyst performance.

As the catalyst for the air electrode used in the present invention, for example, there may be mentioned cobalt phthalocyanine, manganese dioxide, etc. The content of the catalyst in the air electrode layer is preferably 1 to 30% by mass, more preferably 5 to 20% by mass. This is because when the content of the catalyst is too small, there is a possibility of poor catalyst performance; moreover, when the content of the catalyst is too large, the content of the electroconductive material becomes relatively small, so that the area of reaction sites is decreased and results in a possible decrease in battery capacity.

From the viewpoint of smooth electrode reaction, the above-described electroconductive material preferably supports the catalyst.

The air electrode layer is needed to contain at least the electroconductive material. However, it is more preferable that the air electrode layer further contains a binder for fixing the electroconductive material. As the binder, for example, there may be mentioned polyvinylidene fluoride (PVDF), polytetrafluoroethylene (PTFE), etc. The content of the binder in the air electrode layer is not particularly limited.

However, it is preferably 30% by mass or less, more preferably 1 to 10% by mass.

The thickness of the air electrode layer varies depending on the application of the air battery, etc. However, it is preferably 2 to 500 μm, more preferably 5 to 300 μm.

The air electrode layer can further contain an electrolyte for the air electrode. In this case, as the electrolyte for the air electrode, there may be used the liquid electrolyte for lithium batteries of the present invention. Moreover, there may be used the below-described liquid electrolyte, gel electrolyte and solid electrolyte, etc.

In addition to the air electrode layer, the air electrode used in the present invention can comprise an air electrode current collector and an air electrode lead that is connected to the air electrode current collector.

The air electrode current collector used in the present invention functions to collect current from the air electrode layer. The material for the air electrode current collector is not particularly limited, as long as it is electrically conductive. For example, there may be mentioned stainless-steel, nickel, aluminum, iron, titanium and carbon. As the form of the air electrode current collector, there may be mentioned a foil form, a plate form and a mesh (grid) form, for example. Of these, in the present invention, the air electrode current collector is preferably in a mesh form. This is because the air electrode current collector in such a form has excellent current collection efficiency. In this case, normally, the air electrode current collector in a mesh form is provided inside the air electrode layer. In addition, the battery of the present invention can comprise a different air electrode current collector (such as a current collector in a foil form) that collects current collected by the air electrode current collector in a mesh form. Also in the present invention, the below-mentioned battery case can also function as the air electrode current collector.

The thickness of the air electrode current collector is preferably 10 to 1,000 μm, more preferably 20 to 400 μm.

The anode used in the present invention preferably comprises an anode active material layer comprising an anode active material. In general, it further comprises an anode current collector and an anode lead that is connected to the anode current collector.

The anode active material layer used in the present invention comprises an anode active material comprising at least one selected from the group consisting of a metal material, an alloy material and a carbonaceous material. The anode active material used for the anode active material layer is not particularly limited, as long as it can at least occlude or release metal ions. Lithium metals, lithium alloys, lithium-containing metal oxides, lithium-containing metal sulfides, lithium-containing metal nitrides, carbonaceous materials such as graphite, etc., can be used for the anode active material. The anode active material can be in a powder form or a thin film form.

Examples of lithium alloys include a lithium-aluminum alloy, a lithium-tin alloy, a lithium-lead alloy and a lithium-silicon alloy. Examples of lithium-containing metal oxides include a lithium-titanium oxide. Examples of lithium-containing metal nitrides include a lithium-cobalt nitride, a lithium-iron nitride and a lithium-manganese nitride. Also, a solid electrolyte-coated lithium can be used for the anode active material layer.

The anode active material layer can comprise only the anode active material, or it can comprise at least one of the electroconductive material and the binder, in addition to the anode active material. For example, when the anode active material is in the form of a foil, the anode active material layer can be an anode active material layer comprising only the anode active material. When the anode active material is in the form of powder, the anode active material layer can be an anode active material layer comprising the anode active material and the binder. The electroconductive material and the binder are the same as those that can be used for the cathode active material layer or the air electrode layer.

The thickness of the anode active material layer is not particularly limited; however, it is preferably 10 to 100 μm, more preferably 10 to 50 μm.

The anode active material layer can further contain an electrolyte for the anode. In this case, as the electrolyte for the anode, there may be used not only the liquid electrolyte for lithium batteries of the present invention but also the below-described liquid electrolyte, gel electrolyte, solid electrolyte, etc.

As the material for and the form of the anode current collector, there may be used those mentioned above as the material for and the form of the cathode current collector.

The electrolyte used in the present invention is sandwiched between the cathode and the anode and functions to exchange metal ions therebetween.

As the electrolyte, there may be used a liquid electrolyte, a gel electrolyte, a solid electrolyte, etc. They may be used alone or in combination of two or more kinds.

As the liquid electrolyte, there may be used a non-aqueous liquid electrolyte or an aqueous liquid electrolyte.

As the aqueous liquid electrolyte used in the present invention, one containing water and a metal salt is generally used. When the metal battery according to the present invention is a lithium battery, a lithium salt can be used as the metal salt. Examples of the lithium salt include LiOH, LiCl, $LiNO_3$ and $CH_3CO_2Li$.

The non-aqueous liquid electrolyte used in the present invention is the same as the non-aqueous liquid electrolyte that can be used in the above-described liquid electrolyte for batteries.

The liquid electrolyte used in the present invention can contain the liquid electrolyte for lithium batteries of the present invention. The liquid electrolyte used in the present invention can be the liquid electrolyte itself of the present invention.

The gel electrolyte used in the present invention is the same as the non-aqueous gel electrolyte that can be used for the above-described liquid electrolyte for batteries.

As the solid electrolyte, there may be used a sulfide-based solid electrolyte, an oxide-based solid electrolyte, a polymer electrolyte, etc.

Concrete examples of sulfide-based solid electrolytes include $Li_2S$—$P_2S_5$, $Li_2S$—$P_2S_3$, $Li_2S$—$P_2S_3$—$P_2S_5$, $Li_2S$—$SiS_2$, $Li_2S$—$Si_2S$, $Li_2S$—$B_2S_3$, $Li_2S$—$GeS_2$, $LiI$—$Li_2S$—$P_2S_5$, $LiI$—$Li_2S$—$SiS_2$—$P_2S_5$, $Li_2S$—$SiS_2$; —$Li_4SiO_4$, $Li_2S$—$SiS_2$—$Li_3PO_4$, $Li_3PS_4$—$Li_4GeS_4$, $Li_{3.4}P_{0.6}Si_{0.4}S_4$, $Li_{3.25}P_{0.25}Ge_{0.76}S_4$ and $Li_{4-x}Ge_{1-x}P_xS_4$.

Concrete examples of oxide-based solid electrolytes include LiPON (lithium phosphorus oxynitride), $Li_{1.3}Al_{0.3}Ti_{0.7}(PO_4)_3$, $La_{0.51}Li_{0.34}TiO_{0.74}$, $Li_3PO_4$, $Li_2SiO_2$ and $Li_2SiO_4$.

The polymer electrolyte used in the present invention generally contains a metal salt and a polymer. When the metal battery according to the present invention is a lithium battery, a lithium salt can be used as the metal salt. As the lithium salt, there may be used at least one of the above-mentioned inorganic and organic lithium salts. The polymer is not particularly limited as long as it can form a complex with a lithium salt. As the polymer, for example, there may be mentioned polyethylene oxide.

As the solid electrolyte used in the present invention, in addition to the above, there may be mentioned Li$_2$Ti(PO$_4$)$_3$—AlPO$_4$ (Ohara glass), for example.

In the lithium battery of the present invention, a separator infiltrated with the above-described liquid electrolyte can be present between the cathode and anode. As the separator, for example, there may be mentioned polyolefin-based porous films such as those made of polyethylene and polypropylene, and non-woven fabrics such as a resin non-woven fabric and a glass fiber non-woven fabric.

The lithium battery of the present invention generally comprises a battery case for housing the cathode, the liquid electrolyte, the anode and so on. As the form of the battery case, in particular, there may be mentioned a coin form, a flat plate form, a cylinder form and a laminate form, for example.

When the lithium battery of the present invention is a lithium-air battery, the battery case can be an open-to-the-atmosphere battery case or closed battery case. The open battery case is one that has a structure in which at least the air electrode layer can be sufficiently exposed to the air. On the other hand, when the battery case is a closed battery case, it is preferable that the closed battery case is equipped with gas (air) inlet and outlet tubes. In this case, it is preferable that the introduced/emitted gas has a high oxygen concentration, and it is more preferable that the introduced/emitted gas is pure oxygen. It is also preferable that the oxygen concentration is high at the time of discharge and low at the time of charge.

3. Method for Producing Liquid Electrolyte for Lithium Batteries

The method for producing a liquid electrolyte for lithium batteries according to the present invention, comprises the steps of preparing a lithium salt and a mesoionic compound represented by the general formula (1), and producing a liquid electrolyte for lithium batteries which has a water concentration of 200 ppm or less, by mixing at least the lithium salt and the mesoionic compound.

As R$^2$ in the general formula (1), the mesoionic compound used in the present invention has a group represented by the above general formula (2), (3) or (4). Preferably, R$^2$ is one selected from the group consisting of methoxymethyl group (—CH$_2$OCH$_3$), 2-methoxyethyl group (—C$_2$H$_4$OCH$_3$), 3-methoxypropyl group (—C$_3$H$_6$OCH$_3$), 4-methoxybutyl group (—C$_4$H$_8$OCH$_3$), methoxymethoxymethyl group (—CH$_2$OCH$_2$OCH$_3$) (2-methoxyethoxy)methyl group (—CH$_2$OC$_2$H$_4$OCH$_3$), 2-(methoxymethoxy)ethyl group (—C$_2$H$_4$OCH$_2$OCH$_3$), 2-(2-methoxyethoxy)ethyl group (—C$_2$H$_4$OC$_2$H$_4$OCH$_3$) and 2-(methoxymethoxymethoxy) ethyl group (—C$_2$H$_4$OCH$_2$OCH$_2$OCH$_3$).

Hereinafter, an example of the method for producing the mesoionic compound used in the present invention, will be explained. However, the method for producing the mesoionic compound used in the present invention is not limited to this example.

The production example comprises the following steps (1) and (2):

(1) the step of producing a tetrazole-5-thione derivative which has a group represented by the above-mentioned general formula (2), (3) or (4) at the 1-position; and (2) the step of producing a tetrazolium-5-olate derivative which has a group represented by the above-mentioned general formula (2), (3) or (4) at the 1-position and an alkyl group having 1 to 3 carbon atoms at the 3-position.

Hereinafter, the steps (1) and (2) will be explained in detail.

First, in the step (1), as shown by the following reaction formula (a), alkaline azide (MN$_3$; M is an alkali metal) is reacted with isothiocyanate (R$^2$NCS) to synthesize a tetrazole-5-thione derivative which has a group R$^2$ represented by the above-mentioned general formula (2), (3) or (4) at the 1-position.

As the isothiocyanate, for example, there may be used the following: a methoxymethyl isothiocyanate (CH$_3$OCH$_2$NCS) can be used when methoxymethyl group (—CH$_2$OCH$_3$) is needed to be introduced as R$^2$; 2-methoxyethyl isothiocyanate (CH$_3$OC$_2$H$_4$NCS) can be used when 2-methoxyethyl group (—C$_2$H$_4$OCH$_3$) is needed to be introduced as R$^2$; 3-methoxypropyl isothiocyanate (CH$_3$OC$_3$H$_6$NCS) can be used when 3-methoxypropyl group (—C$_3$H$_6$OCH$_3$) is needed to be introduced as R$^2$; 4-methoxybutyl isothiocyanate (CH$_3$OC$_4$H$_8$NCS) can be used when 4-methoxybutyl group (—C$_4$H$_8$OCH$_3$) is needed to be introduced as R$^2$; methoxymethoxymethyl isothiocyanate (CH$_3$OCH$_2$OCH$_2$NCS) can be used when methoxymethoxymethyl group (—CH$_2$OCH$_2$OCH$_3$) is needed to be introduced as R$^2$; (2-methoxyethoxy)methyl isothiocyanate (CH$_3$OC$_2$H$_4$OCH$_2$NCS) can be used when (2-methoxyethoxy)methyl group (—CH$_2$OC$_2$H$_4$OCH$_3$) is needed to be introduced as R$^2$; 2-(methoxymethoxy)ethyl isothiocyanate (CH$_3$OCH$_2$OC$_2$H$_4$NCS) can be used when 2-(methoxymethoxy)ethyl group (—C$_2$H$_4$OCH$_2$OCH$_3$) is needed to be introduced as R$^2$; 2-(2-methoxyethoxy)ethyl isothiocyanate (CH$_3$OC$_2$H$_4$OC$_2$H$_4$NCS) can be used when 2-(2-methoxyethoxy)ethyl group (—C$_2$H$_4$OC$_2$H$_4$OCH$_3$) is needed to be introduced as R$^2$; and 2-(methoxymethoxymethoxy)ethyl isothiocyanate (CH$_3$OCH$_2$OCH$_2$OC$_2$H$_4$NCS) can be used when 2-(methoxymethoxymethoxy)ethyl group (—C$_2$H$_4$OCH$_2$OCH$_2$OCH$_3$) is needed to be introduced as R$^2$.

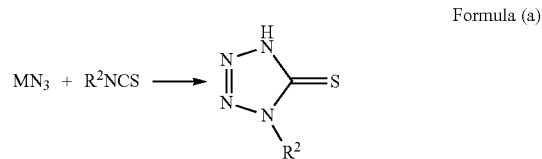

Formula (a)

Next, in the step (2), as shown by the following reaction formula (b), the tetrazole-5-thione derivative synthesized in the step (1) is alkylated by an alkylating agent and then hydrolyzed by a base to synthesize the above-mentioned tetrazolium-5-olate derivative.

The alkylating agent is not particularly limited, as long as it can introduce an alkyl group having 1 to 3 carbon atoms into the 3-position of the tetrasol ring. For example, there may be used dialkyl sulfate, alkali metal alkoxide, alkyl triflate, etc. The base is not particularly limited as long as it can inactivate the excess alkylating agent and hydrolyze the thus-obtained alkylated thiotetrazole derivative.

As the alkylating agent, for example, there may be used the following: at least one of sodium methoxide (NaOCH$_3$) and dimethyl sulfate ((CH$_3$O)$_2$SO$_2$) can be used when the alkyl group R$^1$ has one carbon atom; at least one of sodium ethoxide (NaOC$_2$H$_5$) and diethyl sulfate ((C$_2$H$_5$O)$_2$SO$_2$) is used when the alkyl group R$^1$ has two carbon atoms; and at least one of sodium propoxide (NaOC$_3$H$_7$) and dipropyl sulfate ((C$_3$H$_7$O)$_2$SO$_2$) can be used when the alkyl group R$^1$ has three carbon atoms.

As the base, for example, there may be used inorganic bases such as potassium hydroxide and sodium hydroxide, and aqueous solutions thereof.

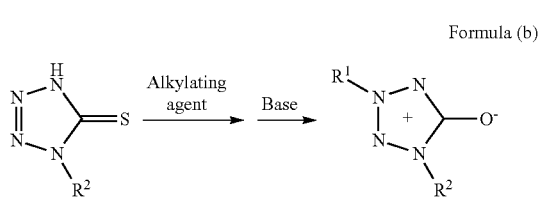

Formula (b)

As shown by the above reaction formulae (a) and (b), the mesoionic compound used in the present invention can be one synthesized under a basic condition. Under a neutral or acidic condition, especially the reaction shown by the reaction formula (b) may not proceed. When completing the reaction (quenching), the reaction solution can be made neutral or acidic.

The mesoionic compound represented by the above general formula (1) is preferably used under a neutral or basic condition. For example, when heated under an acidic condition, the mesoionic compound may be broken.

In the step of producing the liquid electrolyte for lithium batteries, at least the mesoionic compound and a lithium salt are mixed to produce a liquid electrolyte for lithium batteries, the liquid electrolyte having a water concentration of 200 ppm or less. The lithium salt used for the liquid electrolyte is as described above.

Especially by setting the water concentration to 100 ppm or less, battery materials which deteriorate by reaction with water can be used for batteries in combination with the liquid electrolyte for lithium batteries, thus expanding the range of battery material choices. Examples of battery materials which deteriorate by reaction with water include lithium metals, sulfide-based solid electrolytes, etc.

To produce the liquid electrolyte for lithium batteries having a water concentration of 100 ppm or less, for example, there may be mentioned a method in which a liquid of the mesoionic compound is distilled to sufficiently remove water and then mixed with a lithium salt in a glove box under an inert atmosphere. As the lithium salt, non-hydrates are more preferred than hydrates. To measure the water concentration, for example, there may be used the distillation method defined in JIS K 2275, the Karl Fischer capacity titration method, the Karl Fischer coulometric titration method, or a hydrate reaction method. In the Karl Fischer capacity titration method and Karl Fischer coulometric titration method, there may be used a commercially-available Karl Fischer water content meter.

The water concentration in the liquid electrolyte for lithium batteries is preferably as small as possible. For example, the lower limit of the water concentration in the liquid electrolyte can be 0.1 ppm or 1 ppm.

EXAMPLES

Hereinafter, the present invention is further described in detail, by way of examples and comparative examples. However, the present invention is not limited to these examples.

1. Synthesis of Ionic Liquid

Example 1

First, 1-(2-methoxyethyl)-3-methyltetrazolium-5-olate was synthesized.

As the step (1), 1,2-dihydro-1-(2-methoxyethyl)-5H-tetrazole-5-thione was synthesized according to the following reaction formula ($a_1$):

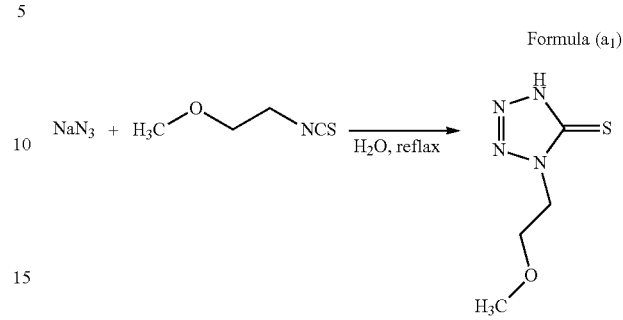

Formula ($a_1$)

In particular, in a reaction container, 0.98 g of sodium azide (15 mmol, manufactured by Kanto Chemical Co., Inc.), 1.1 mL of 1-(2-methoxyethyl)isothiocyanate (10 mmoL, manufactured by Wako Pure Chemical Industries, Ltd.) and 15 mL of water were mixed and stirred under a reflux condition for 24 hours to react the mixture. After allowing the mixture to cool to room temperature (15 to 30° C.), methylene chloride extraction was carried out on the resulting reaction solution. Next, concentrated hydrochloric acid was added to the resulting aqueous phase to acidulate the phase (pH<1). Then, ether extraction was carried out on the aqueous phase. The resulting methylene chloride phase and ether phase were dried and distilled the solvent away from the phases, thus obtaining yellow liquid (116 mg) from the methylene chloride phase and 1,2-dihydro-1-(2-methoxyethyl)-5H-tetrazole-5-thione (colorless liquid, 1.3 g, yield 81%) from the ether phase.

1,2-Dihydro-1-(2-methoxyethyl)-5H-tetrazole-5-thione
IR (neat cm$^{-1}$): 3096, 2939, 2829, 1502, 1352, 1113.
$^1$HNMR (300 MHz, CDCl$_3$): δ3.39 (s, 3H), 3.88 (t, J=5.4 Hz, 2H), 4.50 (t, J=5.4 Hz, 2H).
$^{13}$CNMR (75 MHz, CDCl$_3$): δ46.9, 58.9, 68.4, 164.2.

Next, as the step (2), 1-(2-methoxyethyl)-3-methyltetrazolium-5-olate (MOEMTO) was synthesized according to the following reaction formula ($b_1$):

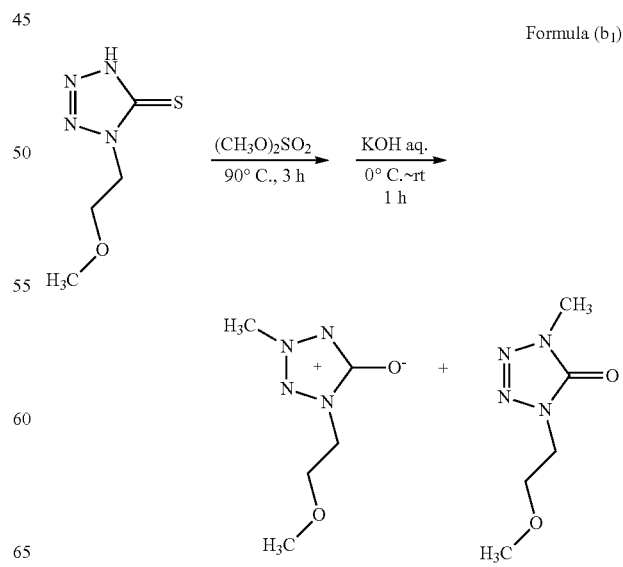

Formula ($b_1$)

In particular, in a reaction container, 160 mg of 1,2-dihydro-1-(2-methoxyethyl)-5H-tetrazole-5-thione (1.0 mmol) and 0.38 mL of dimethyl sulfate (4.0 mmol, manufactured by Nacalai Tesque, Inc.) were mixed and stirred at 90° C. for 3 hours. The mixture was allowed to cool and then iced in an ice bath. A potassium hydroxide aqueous solution (280 mg (5 mmol) of KOH dissolved in 5.0 mL of water) was added to the reaction solution in the ice bath. The mixture was returned to room temperature and then stirred for one hour. Concentrated hydrochloric acid was added to the reaction solution to acidulate the reaction solution (pH<1). Then, ether washing was carried out on the reaction solution. In addition, 0.8 g of potassium hydroxide (manufactured by Nacalai Tesque, Inc.) was added to make the resulting aqueous phase a basic aqueous phase (pH>13), and then methylene chloride extraction was carried out thereon. The resulting methylene chloride phase and ether phase were dried and distilled the solvent away from the phases. From the methylene chloride phase, 1-(2-methoxyethyl)-3-methyltetrazolium-5-olate (colorless liquid, 97 mg, yield 61%) was obtained, which is the ionic liquid of Example 1 and may be referred to as MOEMTO below. Before starting the below-described tests, etc., a predetermined amount of the colorless liquid was purified at once by Kugelrohr distillation (170 to 190° C., 4 to 5 mmHg). From the ether phase, 1,2-dihydro-1-(2-methoxyethyl)-4-methyl-5H-tetrazole-5-thione (yellow liquid, 28 mg, yield 18%) was obtained.

1-(2-Methoxyethyl)-3-methyltetrazolium-5-olate

IR (neat cm$^{-1}$): 2936, 1692, 1334, 1134.

$^1$HNMR (300 MHz, CDCl$_3$): δ3.37 (s, 3H), 3.76 (t, J=5.1 Hz, 2H), 4.12 (s, 3H), 4.23 (t, J=5.3 Hz, 2H).

$^{13}$CNMR (75 MHz, CDCl$_3$): δ41.9, 43.6, 58.1, 68.2, 161.1.

HRMS (ESI) Calcd for C$_5$H$_{13}$N$_4$O$_2$Na (M$^+$Na$^+$): 181.0701; Found: 181.0709.

Comparative Example 1

1-Ethyl-3-methyltetrazolium-5-olate was synthesized.

In the same manner as the method for the synthesis of 1-(2-methoxyethyl)-3-methyltetrazolium-5-olate, 1-ethyl-3-methyltetrazolium-5-olate was obtained by the two-step reaction process, which is the ionic solution of Comparative Example 1 and may be referred to as EMTO below, except that in the step (1), ethyl isothiocyanate (manufactured by Tokyo Chemical Industry Co., Ltd.) was used in place of 1-(2-methoxyethyl)isothiocyanate (manufactured by Wako Pure Chemical Industries, Ltd.)

2. Lithium Metal Immersion Test

Figure 4:
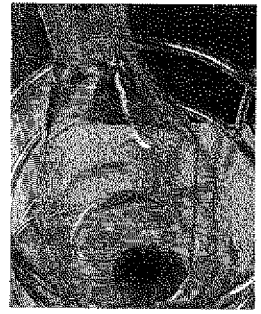
FIG. 4 is an image of the appearance of the ionic liquid (EMTO) of Comparative Example 1, which was taken one week after the immersion of a lithium metal in the ionic liquid.

A lithium metal (manufactured by Honjo Chemical Co., Ltd.) was immersed in each of the ionic liquids of Example 1 and Comparative Example 1 and allowed to stand under an argon atmosphere for one week. FIG. 4 is an image of the appearance of the ionic liquid (EMTO) of Comparative Example 1, which was taken one week after the immersion of the lithium metal in the ionic liquid. As is clear from FIG. 4, one week after the immersion, the ionic liquid (which was a colorless liquid just after the immersion) was discolored to red-brown; moreover, bubble formation is shown in FIG. 4, which is considered to be derived from the decomposition of the ionic liquid.

Figure 2:
FIG. 2 is an image of the appearance of the ionic liquid (MOEMTO) of Example 1, which was taken one week after the immersion of a lithium metal in the ionic liquid.

FIG. 2 is an image of the appearance of the ionic liquid (MOEMTO) of Example 1, which was taken one week after the immersion of the lithium metal in the ionic liquid. As is clear from FIG. 2, it is observed that the lithium metal powder (indicated by the arrow inserted in FIG. 2) is in the same state as immediately after the immersion, and the MOEMTO shows no decomposition or discoloration even one week after the immersion of the lithium metal.

From the above, it has been proved that the mesoionic compound used in the liquid electrolyte for batteries of the present invention, has excellent stability to lithium metals.

3. Production of Liquid Electrolyte for Lithium Batteries

Example 2

Lithium bis(trifluoromethanesulfonyl)amide (manufactured by Kojundo Chemical Laboratory Co., Ltd.; hereinafter it may be referred to as LiTFSA) was weighed and mixed with the ionic liquid of Example 1 (MOEMTO) so that the concentration would be 1.0 mol/kg. The LiTFSA was uniformly dissolved in the ionic liquid and then stirred for 3 hours, thus producing the liquid electrolyte for lithium batteries of Example 2.

Comparative Example 2

LiTFSA was weighed and mixed with the ionic liquid of Comparative Example 1 (EMTO) so that the concentration would be 1.0 mol/kg. The LiTFSA was uniformly dissolved in the ionic liquid and then stirred for 3 hours, thus producing the liquid electrolyte for lithium batteries of Comparative Example 2.

4. CV Test

A CV test was carried out on the liquid electrolytes for lithium batteries of Example 2 and Comparative Example 2. Details of the test are as follows.

Measurement Cell
  Working electrode: Nickel electrode (diameter 1.5 mm)
  Reference electrode: Silver/silver chloride electrode (Ag/Ag$^+$)
  Counter electrode: Platinum electrode
Measurement Device
  Potentiostat/galvanostat (Solatron)
Measurement Method
  Cyclic voltammetry (CV): −1.7 to 1.3 V (vs Ag/Ag$^+$)
Measurement Temperature
  60° C. (Allowed to stand for 3 hours in a constant temperature bath before starting the test)
Measurement Atmosphere
  Pure oxygen (The atmosphere inside the measurement cell was replaced with oxygen for 30 minutes before starting the test)

Figure 3:
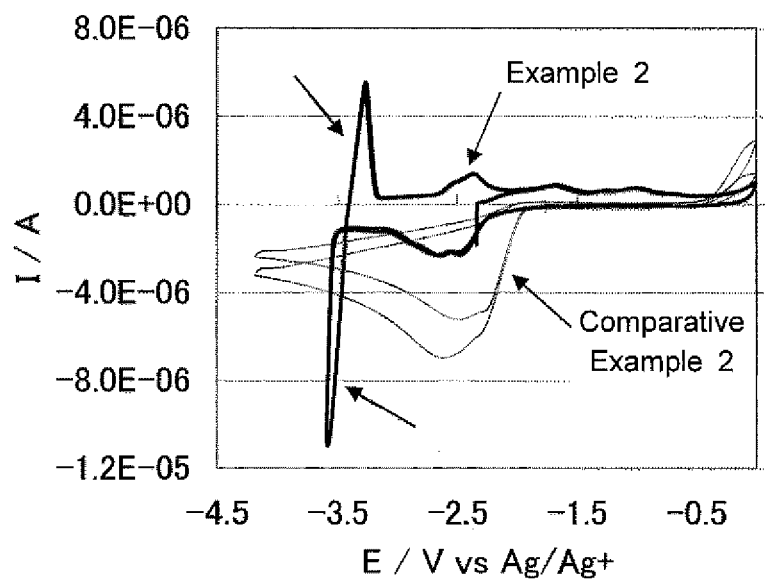
FIG. 3 is a view showing cyclic voltammograms of Example 2 and Comparative Example 2, which are overlapped on each other.

FIG. 3 is a view showing cyclic voltammograms of Example 2 and Comparative Example 2, which are overlapped on each other. In FIG. 3, the cyclic voltammogram of Example 2 is represented by a thick line, while the cyclic voltammogram of Comparative Example 2 is represented by a thin line.

As is clear from FIG. 3, no current peak was observed in the cyclic voltammogram of Comparative Example 2, which is derived from the precipitation or dissolution of the lithium metal.

Meanwhile, as is indicated by the arrows shown in FIG. 3, in the cyclic voltammogram of Example 2, a current peak was observed at −3.5 V (vs Ag/Ag$^+$) of the reduction wave, which is derived from the precipitation of the lithium metal, and a current peak was observed at −3.3 V (vs Ag/Ag+) of the oxidation wave, which is derived from the dissolution of the lithium metal. These observed peaks mean that the lithium metal is present in the liquid electrolyte for lithium batteries of Example 2, maintaining electrode activity. Also, even after repeated cycles, there is no large change in the CV waveform. Therefore, also from the viewpoint of cycle characteristics, it is clear that the dissolution and precipitation of the lithium metal stably occurred. From these results, the liquid electrolyte for lithium batteries of Example 2 is considered to have excellent stability to lithium metals.

From the above, it is clear that compared to the conventional liquid electrolyte for lithium batteries of Comparative Example 2, the stability of the liquid electrolyte for lithium batteries of Example 2 to lithium metals was dramatically increased.

REFERENCE SIGNS LIST

1. Electrolyte
2. Cathode active material layer
3. Anode active material layer
4. Cathode current collector
5. Anode current collector
6. Cathode
7. Anode
100. Lithium battery

The invention claimed is:

1. A liquid electrolyte for lithium batteries, the liquid electrolyte comprising a lithium salt and a mesoionic compound represented by the following general formula (1):

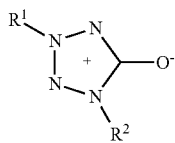

General Formula (1)

where:
R$^1$ is an aliphatic hydrocarbon group having 1 to 3 carbon atoms, and
R$^2$ is selected from the group consisting of methoxymethyl group (—CH$_2$OCH$_3$), 2-methoxyethyl group (—C$_2$H$_4$OCH$_3$), 3-methoxypropyl group (—C$_3$H$_6$OCH$_3$), 4-methoxybutyl group (—C$_4$H$_8$OCH$_3$), methoxymethoxymethyl group (—CH$_2$OCH$_2$OCH$_3$), (2-methoxyethoxy)methyl group (—CH$_2$OC$_2$H$_4$OCH$_3$), 2-(methoxymethoxy)ethyl group (—C$_2$H$_4$OCH$_2$OCH$_3$), 2-(2-methoxyethoxy)ethyl group (—C$_2$H$_4$OC$_2$H$_4$OCH$_3$), and 2-(methoxymethoxymethoxy)ethyl group (—C$_2$H$_4$OCH$_2$OCH$_2$OCH$_3$).

2. The liquid electrolyte for lithium batteries according to claim 1, wherein the lithium salt is present at a concentration in a range of from 0.32 to 1.4 mol/kg.

3. The liquid electrolyte for lithium batteries according to claim 1, wherein the liquid electrolyte is for lithium-air batteries.

4. A lithium battery comprising at least a cathode, an anode and an electrolyte present between the anode and cathode, wherein at least one of the cathode, the anode and the electrolyte comprises the liquid electrolyte for lithium batteries defined by claim 1.

5. A method for producing a liquid electrolyte for lithium batteries, the method comprising:
preparing a lithium salt and a mesoionic compound; and
producing a liquid electrolyte that has a water concentration of 200 ppm or less by mixing at least the lithium salt and the mesoionic compound;
wherein the mesoionic compound is represented by the following general formula (1):

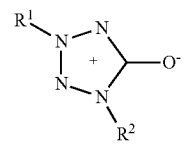

General Formula (1)

where:
R$^1$ is an aliphatic hydrocarbon group having 1 to 3 carbon atoms, and
R$^2$ is selected from the group consisting of methoxymethyl group (—CH$_2$OCH$_3$), 2-methoxyethyl group (—C$_2$H$_4$OCH$_3$), 3-methoxypropyl group (—C$_3$H$_6$OCH$_3$), 4-methoxybutyl group (—C$_4$H$_8$OCH$_3$), methoxymethoxymethyl group (—CH$_2$OCH$_2$OCH$_3$), (2-methoxyethoxy)methyl group (—CH$_2$OC$_2$H$_4$OCH$_3$), 2-(methoxymethoxy)ethyl group (—C$_2$H$_4$OCH$_2$OCH$_3$), 2-(2-methoxyethoxy)ethyl group (—C$_2$H$_4$OC$_2$H$_4$OCH$_3$), and 2-(methoxymethoxymethoxy)ethyl group (—C$_2$H$_4$OCH$_2$OCH$_2$OCH$_3$).

6. The method for producing a liquid electrolyte for lithium batteries according to claim 5, wherein the lithium salt is adjusted to have a lithium salt concentration in a range of from 0.32 to 1.4 mol/kg in the liquid electrolyte during production of the liquid electrolyte.

7. The method for producing a liquid electrolyte for lithium batteries according to claim 5, wherein the liquid electrolyte is produced for lithium-air batteries.

8. The method for producing a liquid electrolyte for lithium batteries according to claim 5, wherein the mesoionic compound is synthesized under a basic condition.

* * * * *